(12) United States Patent
Suzuki et al.

(10) Patent No.: US 8,095,272 B2
(45) Date of Patent: Jan. 10, 2012

(54) YAW MOMENT CONTROL SYSTEM OF VEHICLE

(75) Inventors: Kazuasa Suzuki, Saitama (JP); Minoru Higuchi, Saitama (JP); Yasuji Shibahata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1148 days.

(21) Appl. No.: 11/901,709

(22) Filed: Sep. 18, 2007

(65) Prior Publication Data

US 2008/0084110 A1     Apr. 10, 2008

(30) Foreign Application Priority Data

Oct. 10, 2006   (JP) .................................. 2006-276551
Jan. 22, 2007   (JP) .................................. 2007-011105

(51) Int. Cl.
*A01B 69/00*   (2006.01)
(52) U.S. Cl. .......................................... 701/41; 303/146
(58) Field of Classification Search .................. 303/146; 701/41
See application file for complete search history.

(56) References Cited

U.S. PATENT DOCUMENTS 6,409,287 B1 *   6/2002   Leach et al. .................. 303/146
6,854,356 B2 *   2/2005   Drefahl .......................... 74/552

FOREIGN PATENT DOCUMENTS

| JP | 09-193759 | 7/1997 |
| JP | 3090858 | 7/2000 |
| JP | 2002-166831 A | 6/2002 |
| JP | 2004-352228 | 12/2004 |

* cited by examiner

*Primary Examiner* — John Nguyen
*Assistant Examiner* — Jordan Fei
(74) *Attorney, Agent, or Firm* — Carrier Blackman & Associates, P.C.; Joseph P. Carrier; William D. Blackman

(57) ABSTRACT

A rotatable grip (ancillary operation member) is provided on a part of a steering wheel body of a steering wheel (main operation member) for turning wheels. When the grip is rotated, a difference is generated between left and right wheels, and a yaw moment generated with this difference can assist or suppress the turning of a vehicle. Because the grip constitutes a part of the steering wheel body, it is possible to rotate the grip to assist or suppress the turning of the vehicle, while operating the steering wheel to turn the vehicle. Because both the steering wheel body and the grip can be operated by the same hand of a driver, operational burden on the driver is alleviated. Thus, it is possible to concurrently provide an excellent operability of the main operation member for controlling a kinetic state of the vehicle, and an excellent operability of the ancillary operation member for controlling the operation of a yaw moment generating device.

12 Claims, 13 Drawing Sheets

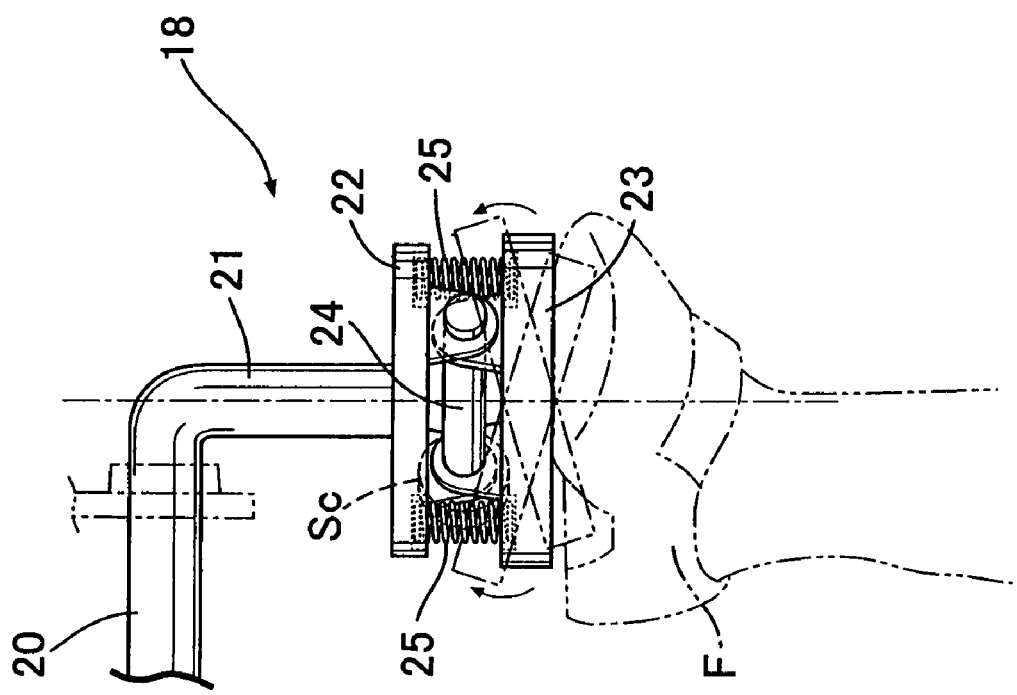
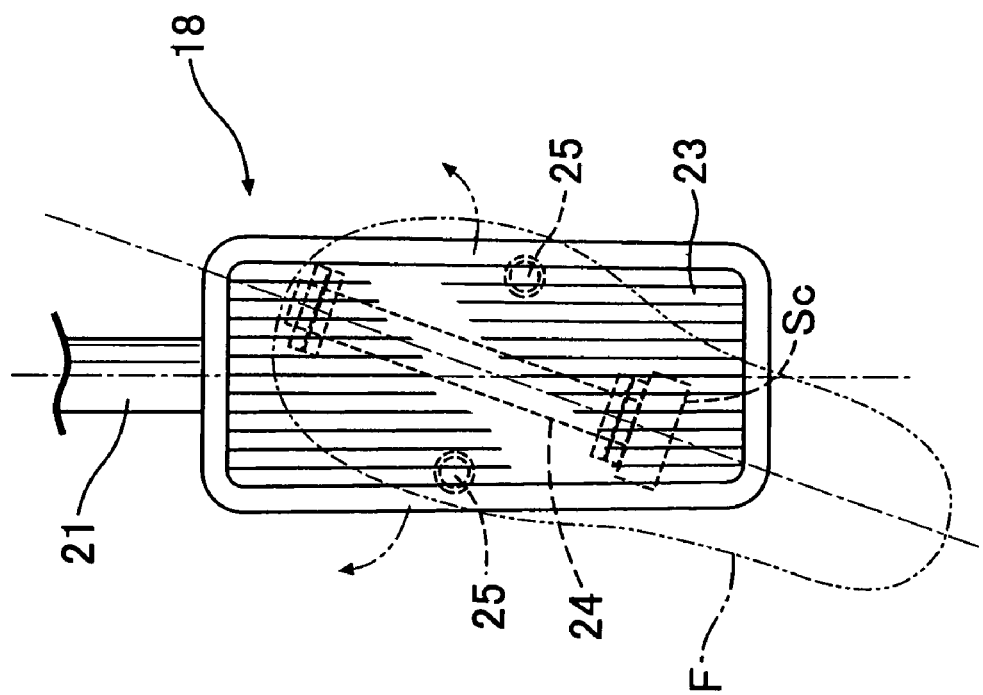

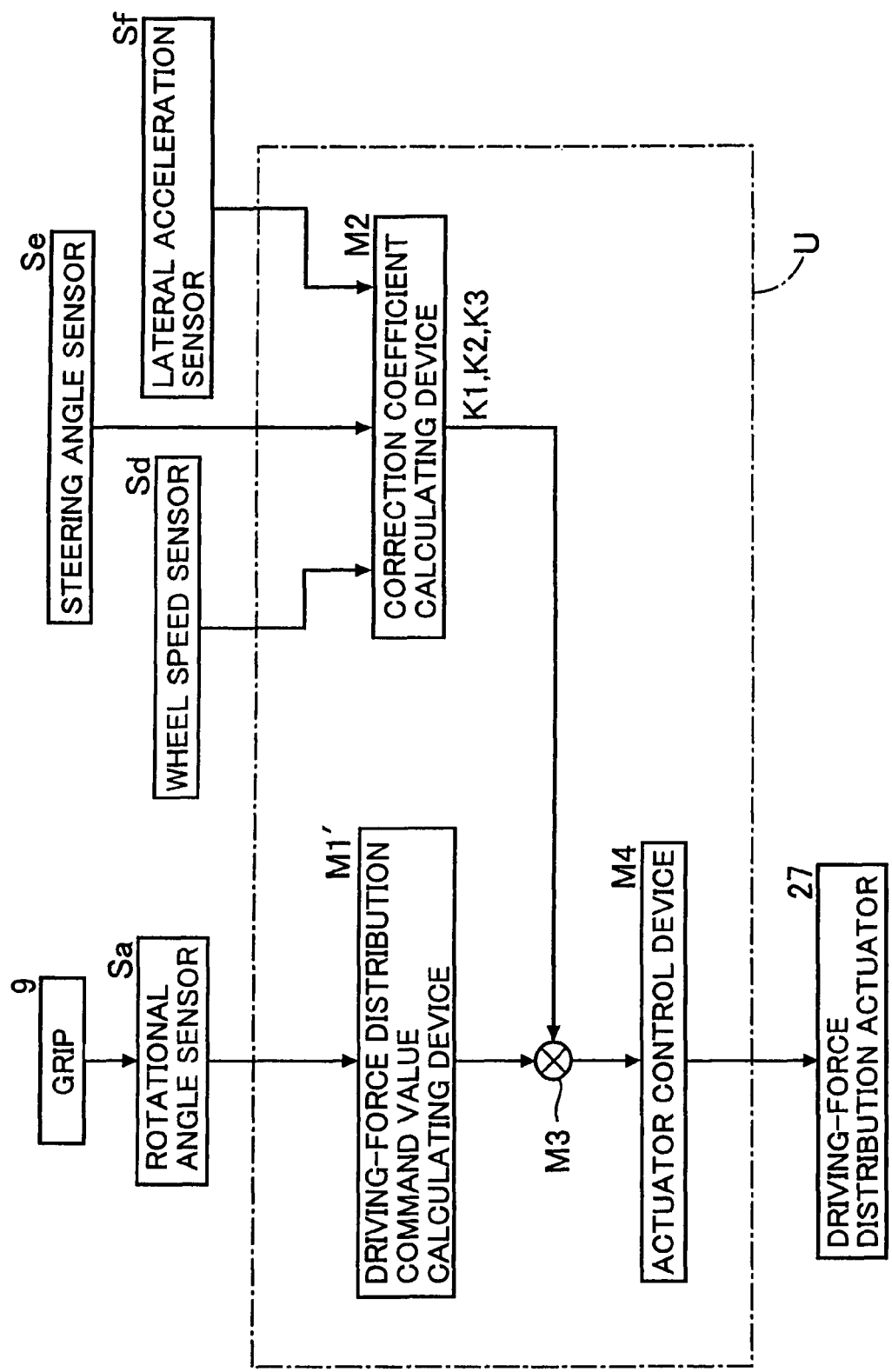

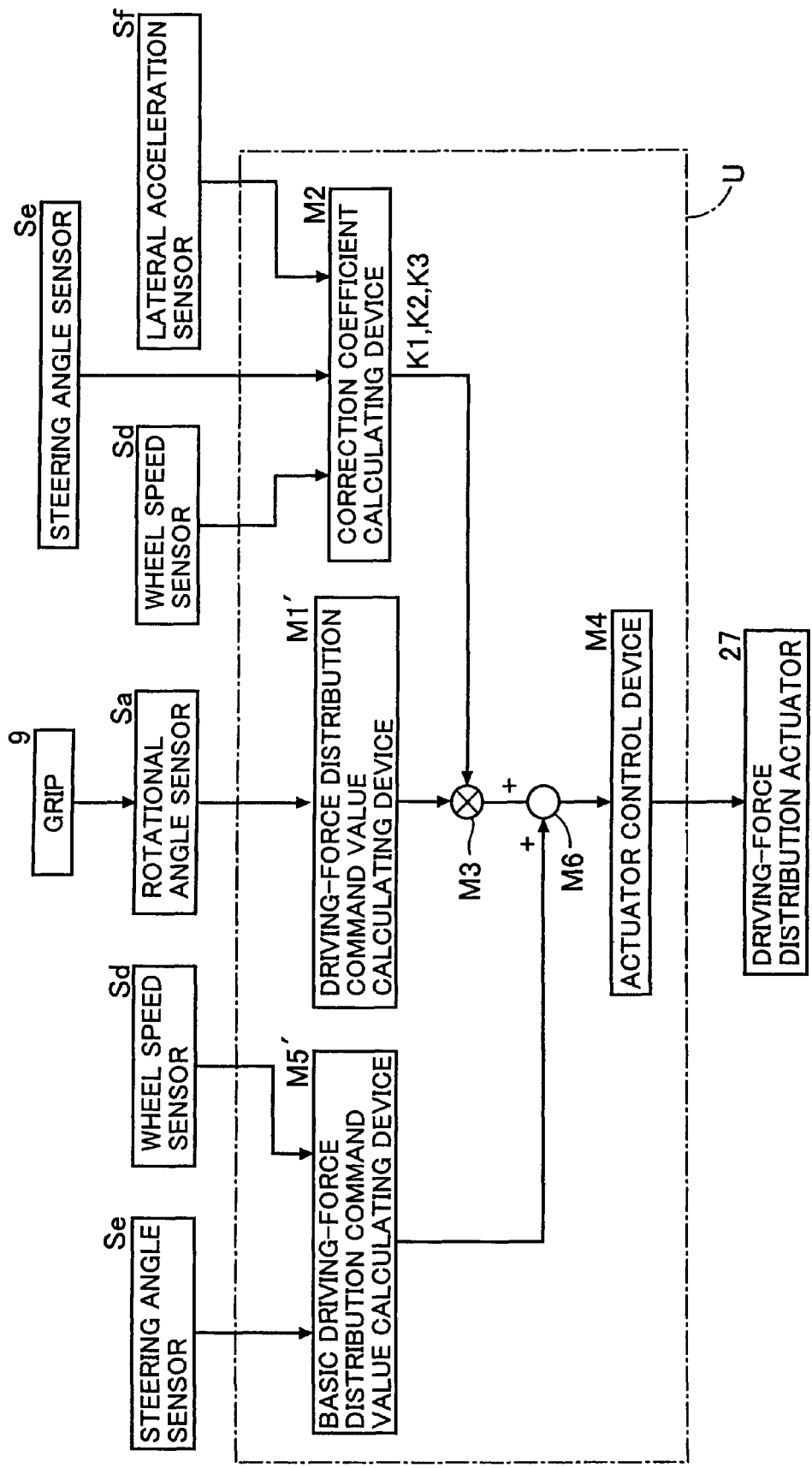

YAW MOMENT CONTROL SYSTEM OF VEHICLE

CROSS-REFERENCE TO RELATED APPLICATIONS

The present invention claims priority under 35 USC §119 based on Japanese patent application Nos. 2006-276551, filed on Oct. 10, 2006 and 2007-11105, filed on Jan. 22, 2007. The entirety of the subject matter of each of these priority documents is incorporated by reference herein.

BACKGROUND OF THE INVENTION

1. Field of the Invention

The present invention relates to a yaw moment control system for a vehicle. Specifically, the present invention relates to a system for easily generating an ancillary yaw moment during control by a driver during a kinetic state of the vehicle.

2. Description of the Related Art

Japanese Patent Application Laid-open No. 2004-352228 discloses a system in which a pedal, which is operated by a driver's foot, is pivotally supported at its intermediate portion so that the pedal can swing forward and backward. When the pedal swings backward from a neutral position, the pedal functions as an accelerator pedal. In this system, a pair of switches are disposed on left and right opposite sides of the pedal and used for sending upshifting and downshifting commands and for actuating left and right winkers.

Also, Japanese Patent No. 3090858 discloses a system in which the operation state can be switched over between a state in which brakes for the left and right rear wheels are independently operated by left and right brake pedals, and a state in which brakes for wheels on the inner side in a turning direction are automatically operated when an angle of rotation of a steering wheel reaches a value equal to or larger than a predetermined value.

Further, Japanese Patent Application Laid-open No. 9-193759 discloses a system in which brakes for left and right rear wheels are independently operated by left and right brake pedals in a state in which a travel speed is smaller than a predetermined value, and the brakes for the left and right rear wheels are simultaneously operated by one of the left and right brake pedals in a state in which the travel speed is equal to or larger than the predetermined value.

Apart from the foregoing, in a conventional system in which braking forces for the left and right wheels are individually controlled by operating an operation member by a driver's hand or foot to output a command signal to generate a yaw moment for assisting the turning of a vehicle or a yaw moment for inhibiting the turning of the vehicle, there is a disadvantage that the steering wheel, the brake pedal or the accelerator pedal is operated with less care when the driver operates the operation member, resulting in a lowered operability.

SUMMARY OF THE INVENTION

The present invention has been achieved in view of the above circumstances, and an object of the present invention is to concurrently provide excellent operability of a main operation member for controlling a kinetic state of a vehicle, and excellent operability of an ancillary operation member for controlling a yaw moment generating device.

In order to achieve the above object, according to a first aspect of the present invention, there is provided a yaw moment control system of a vehicle, comprising: a main operation member operated by a driver to control a kinetic state of the vehicle; an ancillary operation member provided with the main operation member and operated by the driver, and a yaw moment generating device which changes a yaw moment of the vehicle in response to operation of the ancillary operation member.

With the arrangement of the first aspect, when the driver operates the ancillary operation member provided with the main operation member, the yaw moment generating device changes the yaw moment of the vehicle in accordance with the operation of the ancillary operation member. Therefore, it is possible to assist or inhibit the turning of the vehicle, while concurrently operating the main operation member for controlling the kinetic state of the vehicle. In this arrangement, the ancillary operation member is provided with the main operation member, which alleviates operational burden on the driver, as compared with the case where main and ancillary operation members are separately disposed.

According to a second aspect of the present invention, in addition to the first aspect, the main operation member is a steering wheel; and the ancillary operation member is a grip rotatably provided on a portion of a steering wheel body.

With the arrangement of the second aspect, the ancillary operation member is constituted by the grip which is rotatably provided on a portion of the steering wheel body of the steering wheel which serves as the main operation member. Therefore, it is possible to rotate the grip to assist or inhibit the turning of the vehicle, while operating the steering wheel to turn the vehicle. In this arrangement, both the steering wheel body and the grip can be operated by the same hand of the driver, and thus the operational burden on the driver is alleviated.

According to a third aspect of the present invention, in addition to the first aspect, the main operation member is a brake pedal; and the ancillary operation member is an engagement portion laterally swingably provided on a pedal body of the brake pedal.

With the arrangement of the third aspect, the ancillary operation member is constituted by the engagement portion laterally swingably provided on the pedal body of the brake pedal serving as the main operation member. Therefore, it is possible to laterally swing the engagement portion to assist or inhibit the turning of the vehicle, while operating the brake pedal to brake the vehicle. In this arrangement, both the pedal body and the engagement portion can be operated by the same foot of the driver, and thus the operational burden on the driver is alleviated.

According to a fourth aspect of the present invention, in addition to the first aspect, the main operation member is an accelerator pedal; and the ancillary operation member is an engagement portion laterally swingably provided on a pedal body of the accelerator pedal.

With the arrangement of the fourth aspect, the ancillary operation member is constituted by the engagement portion laterally swingably provided on the pedal body of the accelerator pedal serving as the main operation member. Therefore, it is possible to laterally swing the engagement portion to assist or inhibit the turning of the vehicle, while operating the accelerator pedal to accelerate or decelerate the vehicle. In this arrangement, both the pedal body and the engagement portion can be operated by the same foot of the driver, and thus the operational burden on the driver is alleviated.

According to a fifth aspect of the present invention, in addition to any of the first to fourth aspects, the yaw moment generating device comprises at least one of a braking-force lateral distribution device, a driving-force lateral distribution device, a steering device, a four-wheel steering device and a device for changing a damping force of a suspension damper.

With the arrangement of the fifth aspect, the yaw moment generating device is constituted by at least one of a braking-force lateral distribution device, a driving-force lateral distribution device, a steering device, a four-wheel steering device and a device for changing a damping force of a suspension damper. Therefore, it is possible to appropriately generate a yaw moment for assisting or inhibiting the turning of the vehicle.

The above-mentioned object, other objects, characteristics, and advantages of the present invention will become apparent from present exemplary embodiments of the invention, which will be described in detail below by reference to the attached drawings. The exemplary embodiments are not intended to limit the scope of the claimed invention, but are presented to assist the artisan in fully understanding the invention.

BRIEF DESCRIPTION OF THE DRAWINGS

FIG. 7A is a view taken in the direction of arrow 7A in FIG. 6.

FIG. 7B is a view taken in the direction of arrow 7B in FIG. 6.

FIG. 12 is a block diagram showing the arrangement of a yaw moment control system according to a fifth embodiment of the present invention.

FIG. 13 is a block diagram showing the arrangement of a yaw moment control system according to a sixth embodiment of the present invention.

DETAILED DESCRIPTION OF PRESENT EMBODIMENTS

Figure 1:
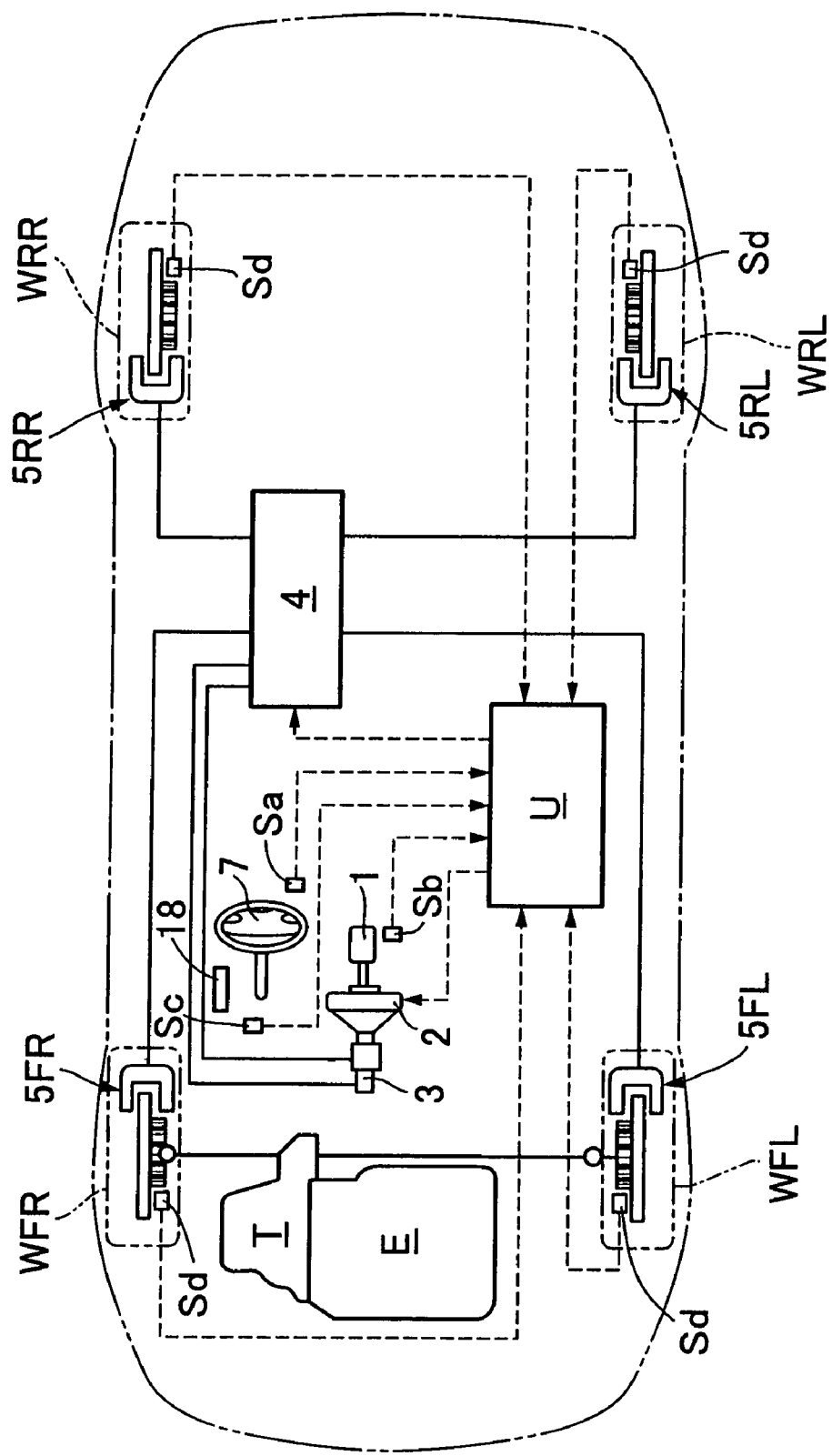
FIG. 1 is a schematic view showing the entire arrangement of an automobile provided with a yaw moment control system according to a first embodiment of the present invention.
Figure 2:
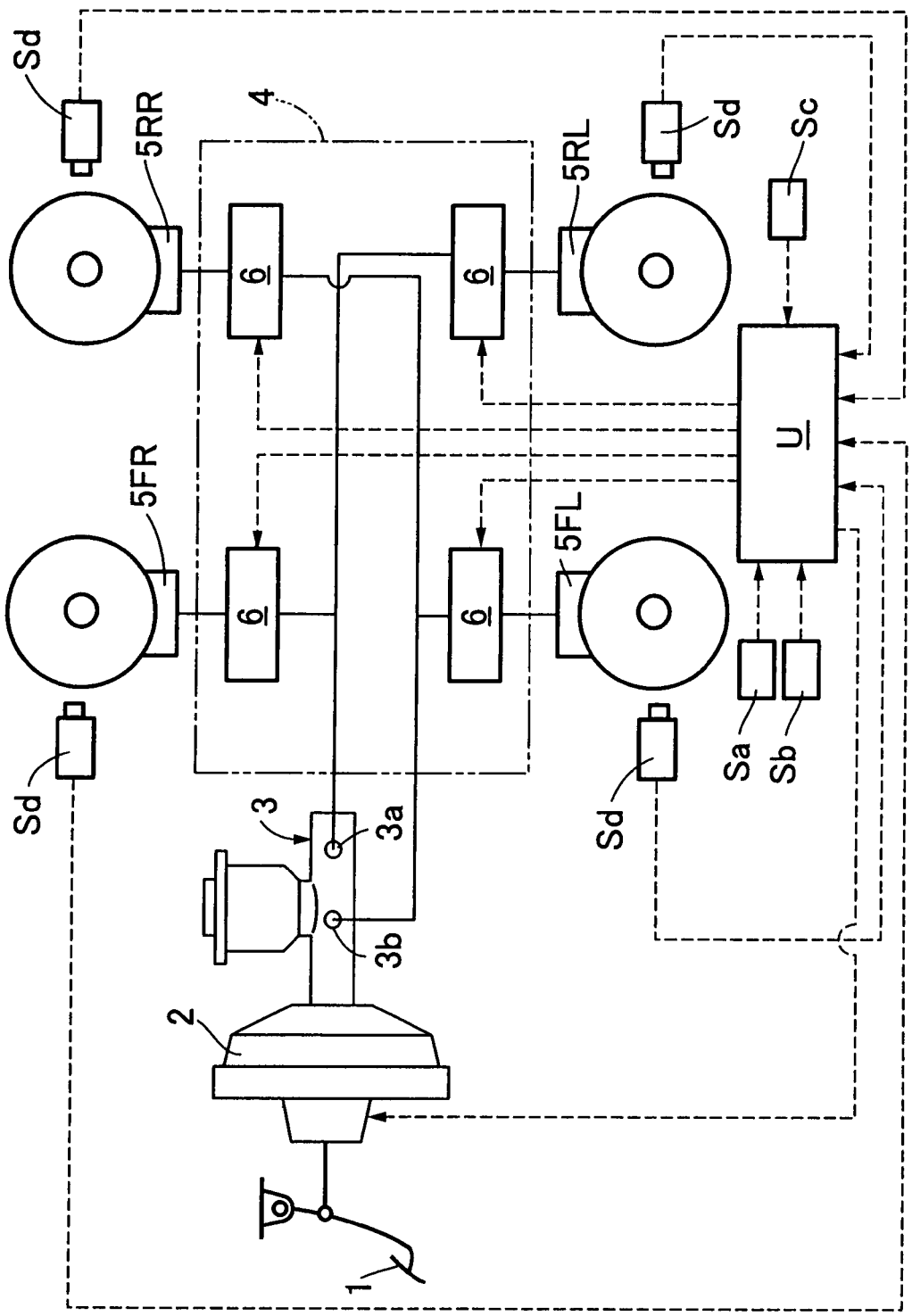
FIG. 2 is a block diagram showing the arrangement of the yaw moment control system of the first embodiment.

FIGS. 1 and 2 show a four-wheeled vehicle provided with a yaw moment control system according to a first embodiment. The vehicle includes: left and right front wheels WFL, WFR which are driven wheels to which a driving force of an engine E is transmitted through a transmission T; and left and right rear wheels WRL, WRR which are follower wheels rotated with traveling of the vehicle. A brake pedal 1 to be operated by a driver is connected to a master cylinder 3 through an electronically controlled vacuum booster 2. The electronically controlled vacuum booster 2 mechanically boosts a depression force on the brake pedal 1 to actuate the master cylinder 3. During automatic braking, the electronically controlled vacuum booster 2 actuates the master cylinder 3 by a braking command signal from an electronic control unit U without depending on the operation of the brake pedal 1. An input rod of the electronically controlled vacuum booster 2 is connected to the brake pedal 1 through a lost motion mechanism. Even if the electronically controlled vacuum booster 2 is actuated by the signal from the electronic control unit U to move the input rod forward, the brake pedal 1 remains in an initial position.

A pair of output ports 3a, 3b in the master cylinder 3 are connected to brake calipers 5FL, 5FR, 5RL, 5RR mounted respectively on the front wheels WFL, WFR and the rear wheels WRL, WRR through a hydraulic pressure control device 4 serving as a yaw moment generating device according to the present invention. The hydraulic pressure control device 4 includes four pressure regulators 6 corresponding to the four brake calipers 5FL, 5FR, 5RL, 5RR. The pressure regulators 6 are connected to the electronic control unit U, and individually control the operations of the brake calipers 5FL, 5FR, 5RL, 5RR mounted on the front wheels WFL, WFR and the rear wheels WRL, WRR.

Therefore, if the braking hydraulic pressures transmitted to the brake calipers 5FL, 5FR, 5RL and 5RR mounted on the respective wheels WFL, WFR, WRL and WRR are independently controlled by the pressure regulators 6, a yaw moment of the vehicle can be arbitrarily controlled to assist or suppress the turning of the vehicle, and also an anti-lock brake control for inhibiting the locking of the wheels WFL, WFR, WRL and WRR during braking can be performed.

Figure 3:
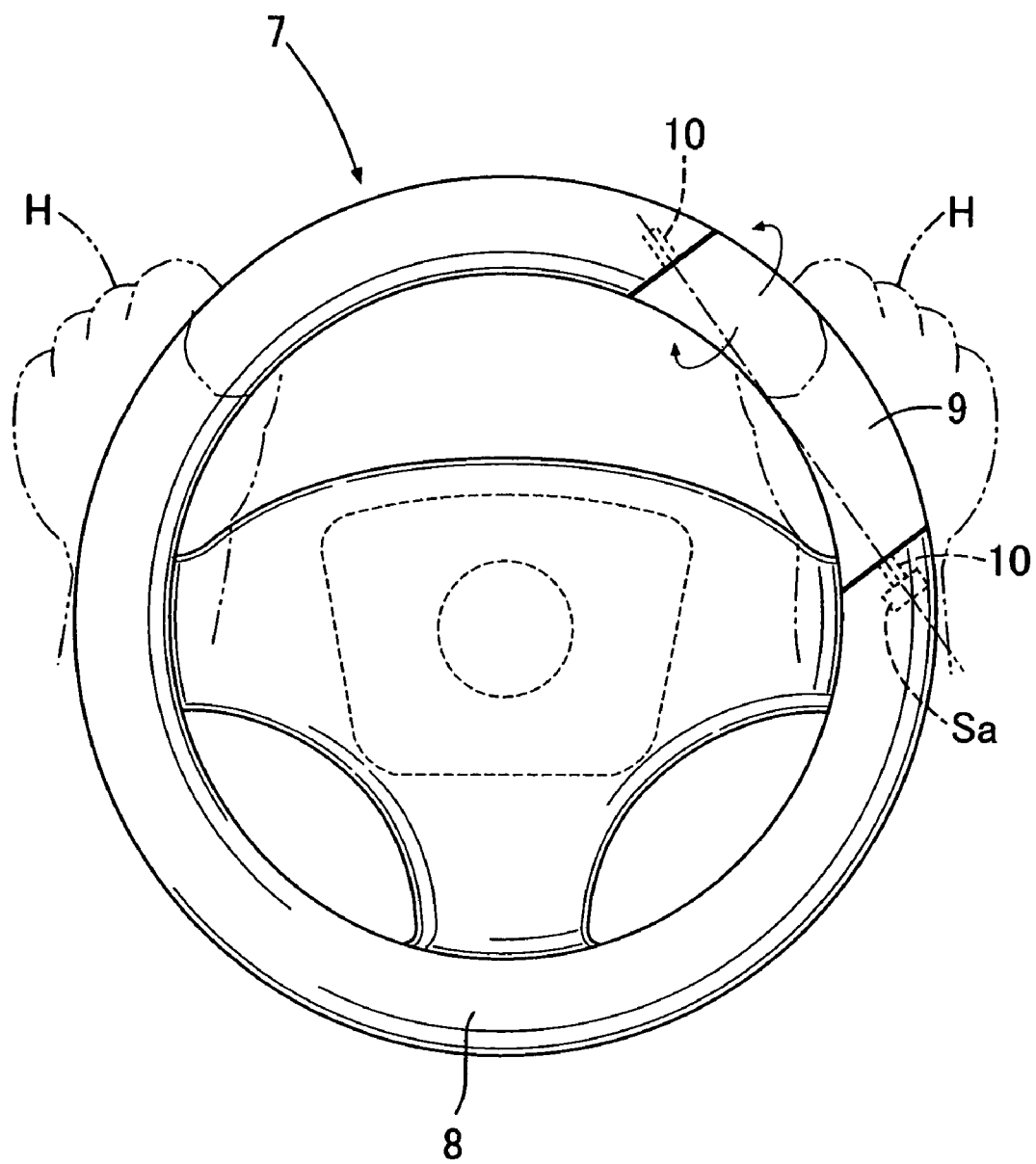
FIG. 3 is a perspective view of a steering wheel including an ancillary operation member according to the first embodiment.

As shown in FIGS. 1 and 3, a steering wheel 7 includes an annular steering wheel body 8, a portion of which (for example, a portion grabbed by a right hand of a driver) is constituted by a grip 9 which is a separate member. The grip 9 is rotatable about rotational axes 10, 10 extending in a tangent direction thereof, and an angle of rotation of the grip 9 is detected by a grip rotational-angle sensor Sa. The grip 9 is urged to a neutral position by a return spring (not shown).

Figure 4:
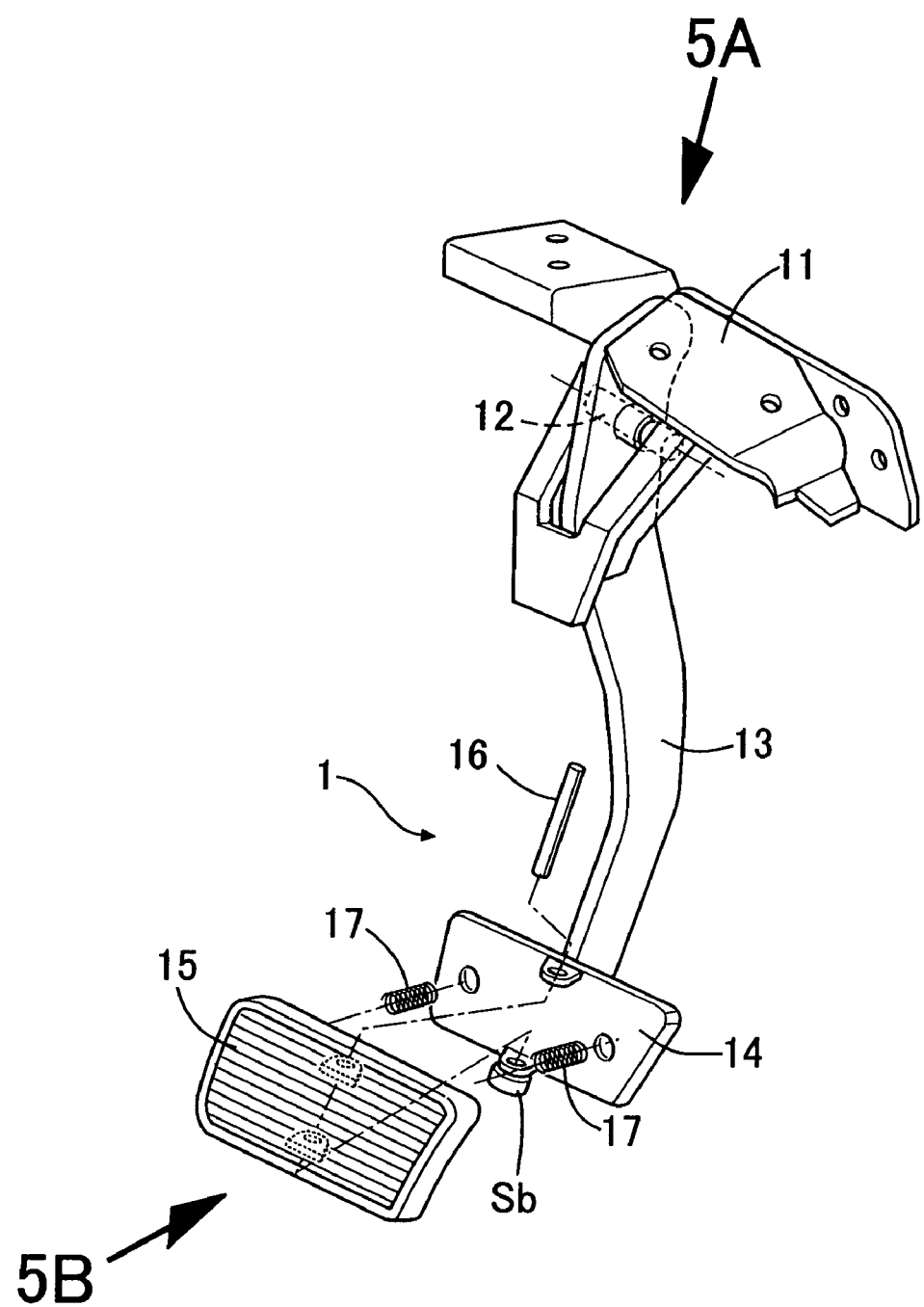
FIG. 4 is an exploded perspective view of a brake pedal including an ancillary operation member according to the first embodiment.
Figure 5A:
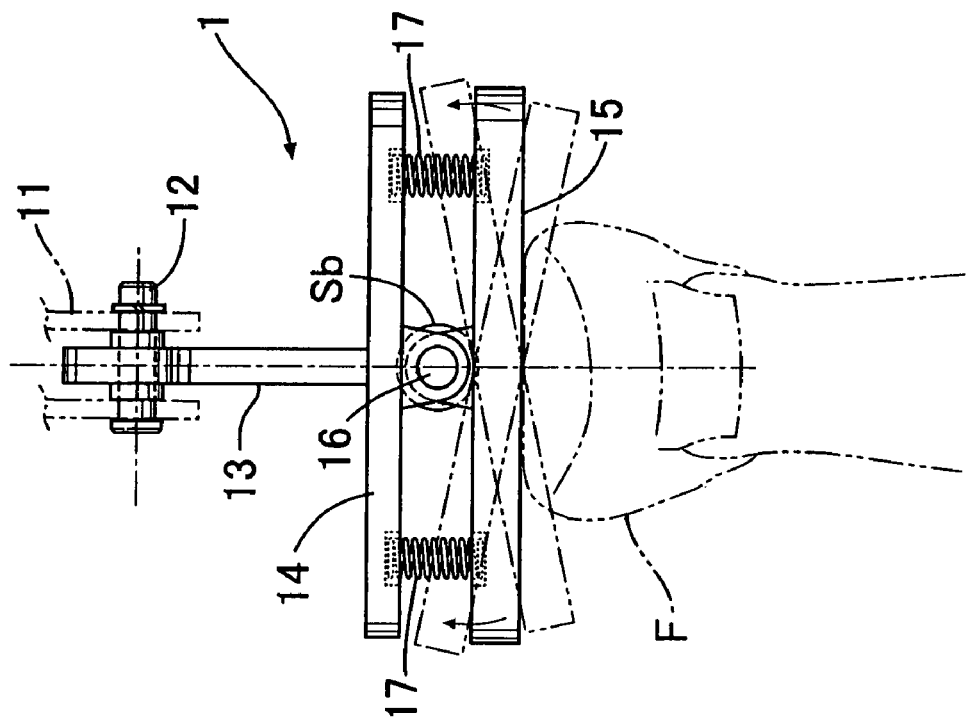
FIG. 5A is a view taken in the direction of arrow 5A in FIG. 4.
Figure 5B:
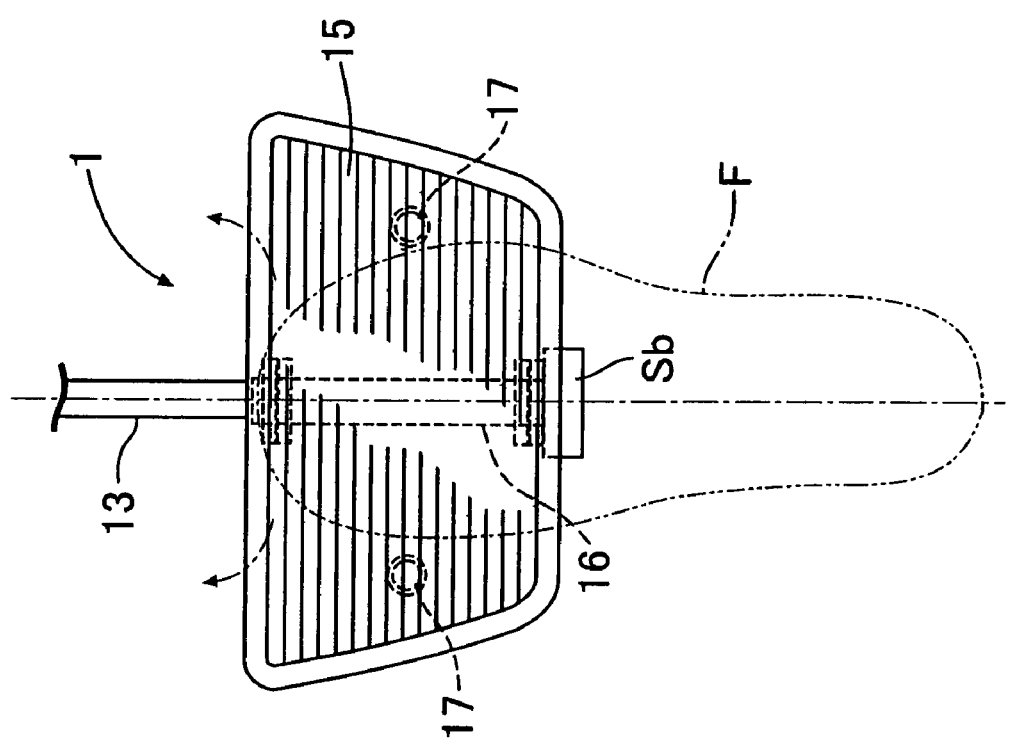
FIG. 5B is a view taken in the direction of arrow 5B in FIG. 4.

As shown in FIGS. 1, 4 and 5, the brake pedal 1 includes a pedal arm 13 which is pivotally supported at its upper end through a pin 12 laterally disposed on a bracket 11 fixed to a vehicle body. An engagement portion 15 to be depressed by a driver's foot F is pivotally supported for lateral swinging on a surface (a surface facing the driver) of a pedal body 14 provided at a lower end of the pedal arm 13 through a vertically extending pin 16. The engagement portion 15 is urged by a pair of return springs 17, 17 disposed between the engagement portion 15 and the pedal body 14 so as to be parallel to the pedal body 14. An engagement portion swinging-angle sensor Sb is provided at a lower end of the pedal body 14, and connected to the pin 16 which swings integrally with the engagement portion 15, so that the engagement portion swinging-angle sensor Sb can detect an angle of swinging of the engagement portion 15.

Figure 6:
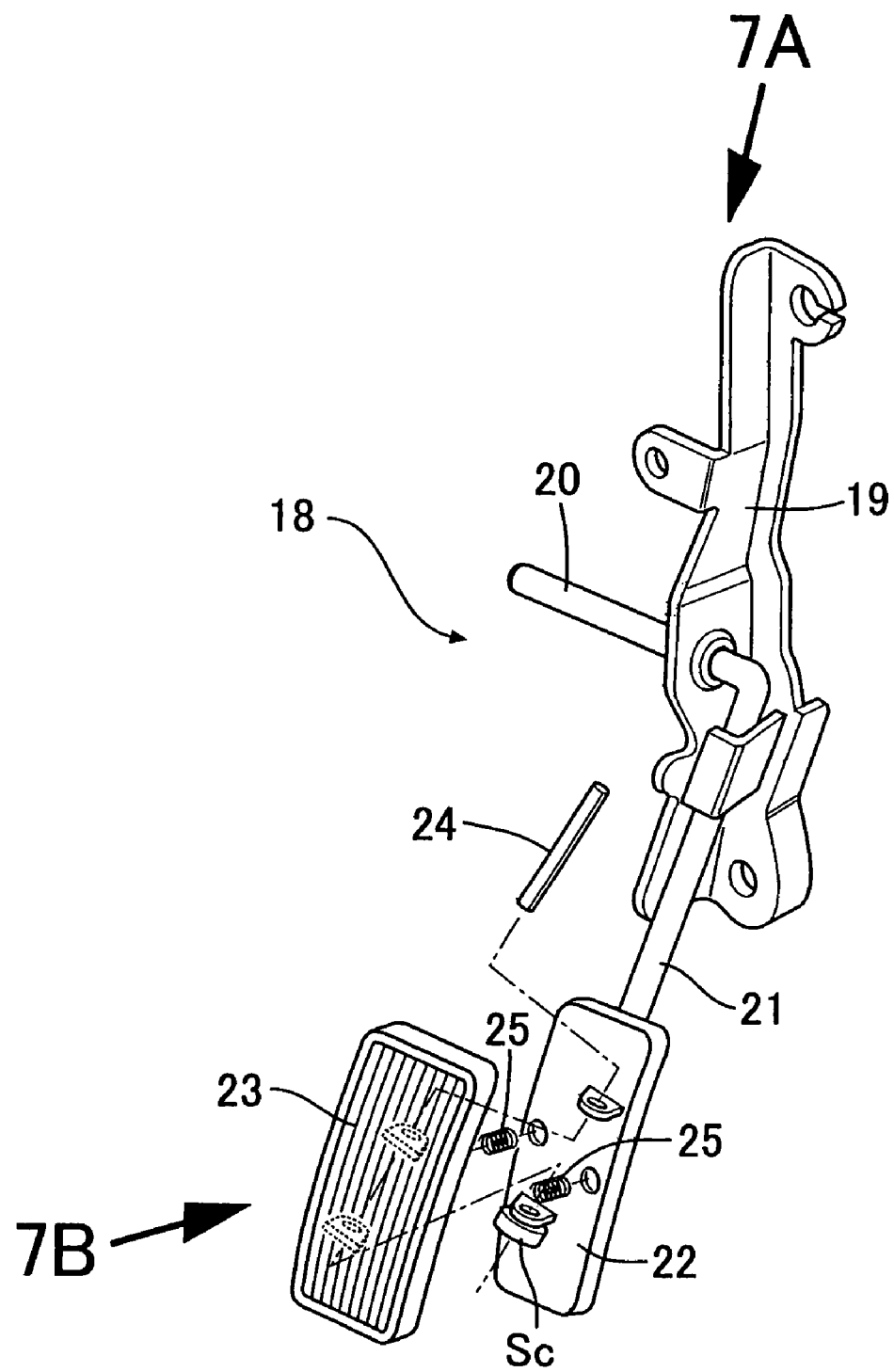
FIG. 6 is an exploded perspective view of an accelerator pedal including an ancillary operation member according to the first embodiment.

As shown in FIGS. 1, 6 and 7, an accelerator pedal 18 includes a pedal arm 21 which is pivotally supported at its upper end through a pin 20 laterally disposed on a bracket 19 fixed to the vehicle body. An engagement portion 23 to be depressed by the driver's foot F is pivotally supported for laterally swinging on a surface (a surface facing the driver) of a pedal body 22 provided at a lower end of the pedal arm 21 through a vertically extending pin 24. The engagement portion 23 is urged by a pair of return springs 25, 25 disposed between the engagement portion 23 and the pedal body 22 so as to be parallel to the pedal body 22. An engagement portion swinging-angle sensor Sc is provided at a lower end of the pedal body 22, and connected to the pin 24 which swings integrally with the engagement portion 23, so that the engagement portion swinging-angle sensor Sc can detect an angle of swinging of the engagement portion 23.

Because the driver's toe is often inclined rightward when the driver puts his foot onto the accelerator pedal, an upper portion of the pin 24 serving as a swinging axis of the engagement portion 23 is disposed so as to be inclined rightward, thereby improving the operability of the engagement portion 23.

The following sensors are connected to the electronic control unit U: the grip rotational-angle sensor Sa for detecting an angle of rotation of the grip 9, the engagement portion swinging-angle sensor Sb for detecting an angle of swinging of the engagement portion 15 of the brake pedal 1, the engagement portion swinging-angle sensor Sc for detecting an angle of swinging of the engagement portion 23 of the accelerator pedal 18, and vehicle wheel speed sensors Sd for detecting rotational speeds of the front wheels WFL and WFR and the rear wheels WRL and WRR respectively. The electronic control unit U controls the operations of the electronically controlled vacuum booster 2 and the hydraulic pressure control device 4.

The operation of the first embodiment of the present invention having the above-described structure will be described below.

When the driver rotates the steering wheel 7 leftward or rightward, the front wheels WFL and WFR are steered to the left or to the right respectively, whereby the vehicle is turned. When the driver rotates the grip 9 provided in the steering wheel body 8 at a position where the driver's right hand usually grabs, an angle of rotation of the grip 9 detected by the grip rotational angle sensor Sa is inputted to the electronic control unit U. The electronic control unit U then actuates the electronically controlled vacuum booster 2 and the pressure regulators 6 of the hydraulic pressure control device 4 to automatically and individually control braking forces for the left and right wheels.

For example, when the driver judges an under-steering tendency during rightward turning of the vehicle and rotates the grip 9 rightward, braking forces act on only right wheels which are wheels on the turning inner side, thereby generating a yaw moment causing the vehicle to turn rightward. Thus, this yaw moment can eliminate the under-steering tendency. On the other hand, when the driver judges an over-steering tendency during rightward turning of the vehicle and rotates the grip 9 leftward, braking forces act on only left wheels which are wheels on the turning outer side, thereby generating a yaw moment causing the vehicle to turn leftward. Thus, this yaw moment can eliminate the over-steering tendency.

Even during leftward turning of the vehicle, or even during straight traveling of the vehicle, the control of a yaw moment can be performed likewise by the operation of the grip 9. The magnitude of the yaw moment generated at this time can be regulated by a rotation angle of the grip 9.

As described above, a yaw moment having any direction and any magnitude can be generated by rotating the grip 9 rotatably provided on a portion of the steering wheel body 8, and hence it is possible to rotate the grip 9 to assist or inhibit the turning of the vehicle, while operating the steering wheel 7 to turn vehicle. At this time, because both the steering wheel body 8 and the grip 9 can be operated by the same right hand of the driver, the operational burden on the driver is alleviated.

Alternatively, the grip 9 may be mounted in a position to be operated by the driver's left hand. Also, both a grip 9 operated by the driver's right hand and a grip 9 operated by the driver's left hand may be mounted. Further, if the grip 9 is formed of a material having a flexibility so that the steering wheel body 8 maintains its circular shape even when the grip 9 is rotated, the operability is further improved.

When the brake pedal 1 is depressed during traveling of the vehicle, the wheels are braked by a braking hydraulic pressure generated by the master cylinder 3. At this time, if the engagement portion 15 of the brake pedal 1 is swung to the left or right about the pin 16 by the driver's foot F, the electronic control unit U controls braking forces individually for the left and right wheels through the hydraulic pressure control device 4, based on an angle of swinging of the engagement portion 15 detected by the engagement portion swinging-angle sensor Sb.

For example, if a depressing force is applied to a right side of the engagement portion 15 when the brake pedal 1 is depressed, one portion of the braking hydraulic pressure generated by the master cylinder 3, which is transmitted to the right wheels, is increased by the hydraulic pressure control device 4, and the other portion of the braking hydraulic pressure generated by the master cylinder 3, which is transmitted to the left wheels, is decreased by the hydraulic pressure control device 4, thereby generating a yaw moment in a rightward turning direction. On the other hand, when a depressing force is applied to a left side of the engagement portion 15 when the brake pedal 1 is depressed, one portion of the braking hydraulic pressure generated by the master cylinder 3, which is transmitted to the left wheels, is increased by the hydraulic pressure control device 4, and the other portion of the braking hydraulic pressure which is transmitted to the right wheels is decreased by the hydraulic pressure control device 4, thereby generating a yaw moment in a leftward turning direction.

Therefore, a yaw moment having any direction and any magnitude can be generated during braking performed by the depression of the pedal 1. Further, the control of the braking forces and the control of the yaw moment can be simultaneously performed using only the driver's foot. Thus, the operational burden on the driver is alleviated.

When the accelerator pedal 18 is operated during traveling of the vehicle, the vehicle is accelerated or decelerated. At this time, if the engagement portion 23 of the accelerator pedal 18 is swung to the left or right about the pin 24 by the driver's foot F, the electronic control unit U controls the braking forces individually for the left and right wheels through the electronically controlled vacuum booster 2 and the hydraulic pressure control device 4, based on an angle of swinging of the engagement portion 23 detected by the engagement portion swinging-angle sensor Sc.

For example, if a depression force is applied to a right side of the engagement portion 23 when the accelerator pedal 18 is depressed, the electronically controlled vacuum booster 2a is operated, and one portion of the braking hydraulic pressure generated by the master cylinder 3, which is transmitted to the right wheels, is increased by the hydraulic pressure control device 4, and the other portion of the braking hydraulic pressure transmitted to the left wheels is decreased by the hydraulic pressure control device 4, thereby generating a yaw moment in a rightward turning direction. On the other hand, when a depression force is applied to a left side of the engagement portion 23 when the accelerator pedal 18 is depressed, one portion of the braking hydraulic pressure generated by the master cylinder 3, which is transmitted to the left wheels, is increased by the hydraulic pressure control device 4, and the other portion of the braking hydraulic pressure, which is transmitted to the right wheels, is decreased by the hydraulic pressure control device 4, thereby generating a yaw moment in a leftward turning direction Therefore, in each case of acceleration, constant-speed traveling and deceleration with the driver's foot put on the accelerator pedal 18, a yaw moment having any direction and any magnitude can be generated, and further the acceleration/deceleration and the control of the yaw moment can be concurrently controlled using only the driver's foot, thereby alleviating the operational burden on the driver.

A second embodiment of the present invention will now be described with reference to FIGS. 8 and 9.

The first embodiment uses the hydraulic pressure control device a (a braking-force lateral distributing device), as a yaw moment generating device, capable of distributing braking forces to the left and right wheels as desired. However, the second embodiment uses a four-wheel steering device, as the yaw moment generating device, capable of steering the rear wheels WRL and WRR in addition to the front wheels WFL and WFR, and turning angles of the rear wheels WRL and WRR are controlled by the operation of the grip 9.

Figure 8:
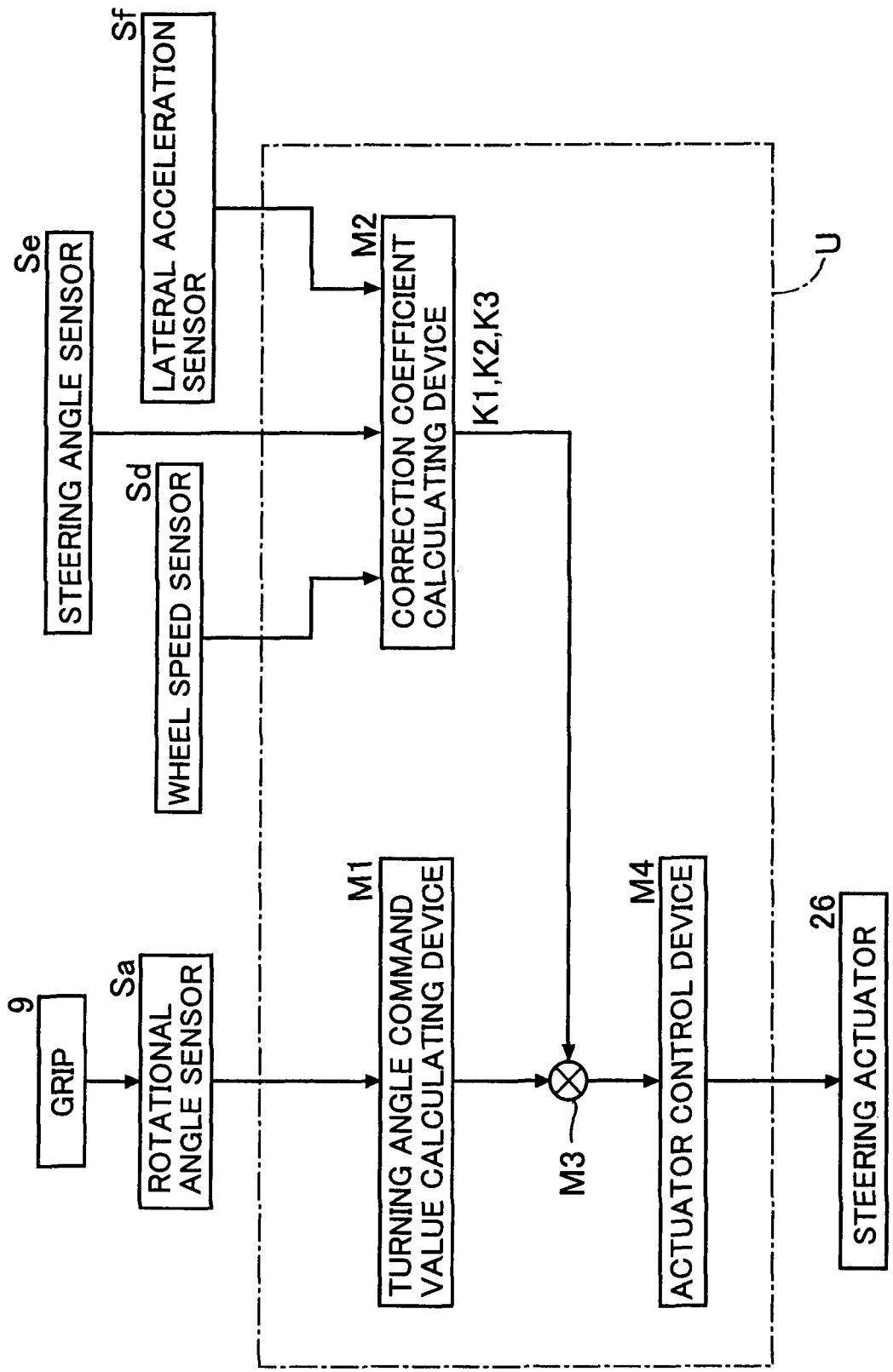
FIG. 8 is a block diagram showing the arrangement of a yaw moment control system according to a second embodiment of the present invention.

As shown in FIG. 8, the electronic control unit U includes a turning angle command value calculating device M1, a correction coefficient calculating device M2, a multiplying device M3, and an actuator control device M4. A grip rotational angle sensor Sa is connected to the turning angle command value calculating device M1. Connected to the correction coefficient calculating device M2 are wheel speed sensors Sd for detecting a vehicle speed, a steering angle sensor Se for detecting an angle of steering of the steering wheel 7, and a lateral acceleration sensor Sf for detecting a lateral acceleration of the vehicle. Further, a steering actuator 26 for the rear wheels WRL and WRR in the four-wheel steering device is connected to the actuator control device M4.

The operation of the second embodiment having the above-described arrangement will be described below.

When the driver rotates the grip 9 provided in the steering wheel body 8, an angle of rotation of the grip 9 detected by the grip rotational angle sensor Sa is inputted to the turning angle command value calculating device M1 of the electronic control unit U. The turning angle command value calculating device M1 calculates a command value of a turning angle for the rear wheels WRL and WRR corresponding to the angle of rotation of the grip 9.

Figure 9A:
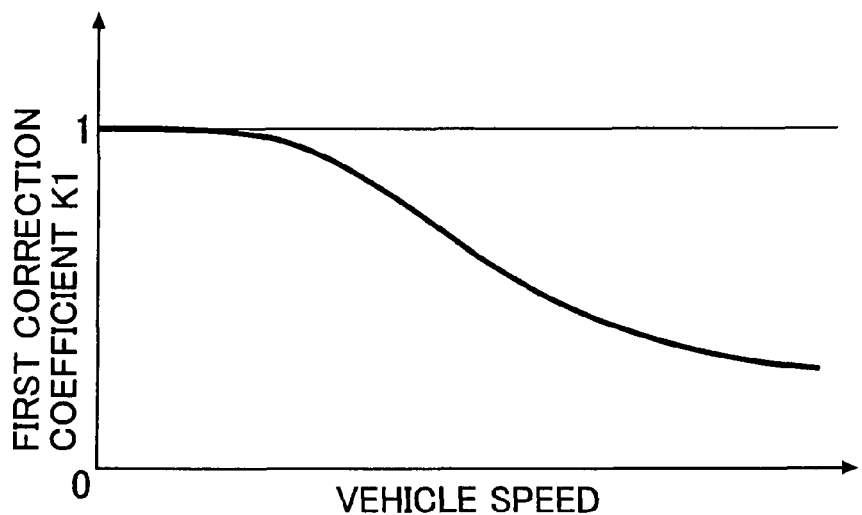
FIGS. 9A, 9B and 9C are diagrams showing maps for searching first, second and third correction coefficients.

A vehicle speed detected by the wheel speed sensors Sd is inputted to the correction coefficient calculating device M2, which calculates a first correction coefficient K1 based on a map in FIG. 9A using the vehicle speed as a parameter. The first correction coefficient K1 assumes 1, which is the maximum value, when the vehicle speed is 0. As the vehicle speed is increased from 0, the first correction coefficient K1 is gradually decreased from the maximum value.

Figure 9B:
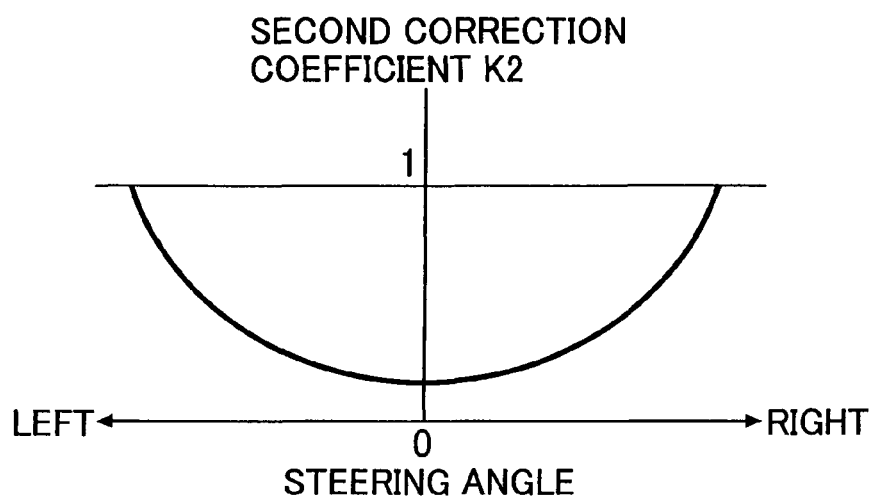

A steering angle detected by the steering angle sensor Se is inputted to the correction coefficient calculating device M2, which calculates a second correction coefficient K2 based on a map in FIG. 9B using the steering angle as a parameter. The second correction coefficient K2 assumes a minimum value smaller than 1, when the steering angle is 0. As the steering angle is increased from 0 to left or right sides, the second correction coefficient K2 is increased from the minimum value toward 1.

Figure 9C:
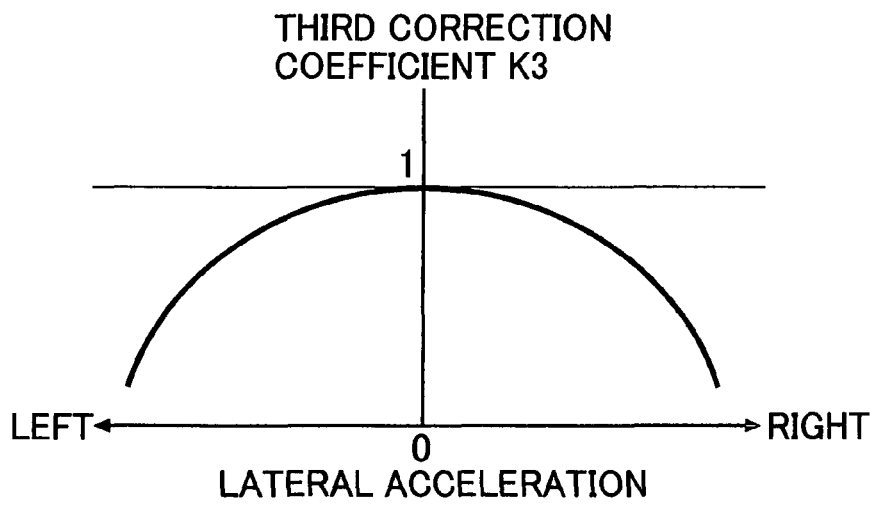

A lateral acceleration detected by the lateral acceleration sensor Sf is inputted to the correction coefficient calculating device M2, which calculates a third correction coefficient K3 based on a map in FIG. 9C using the lateral acceleration as a parameter. The third correction coefficient K3 assumes 1, when the lateral acceleration is 0. As the lateral acceleration is increased from 0 to left or right sides, the third correction coefficient K2 is decreased from 1.

The command value of the turning angle outputted by the turning angle command value calculating device M1 is corrected in the multiplying device M3 such that it is multiplied by the first, second and third correction coefficients K1, K2 and K3. Based on the corrected command value of the turning angle, the actuator control device M4 operates the steering actuator 26, thereby generating a turning angle corresponding to the corrected command value of the turning angle.

When the vehicle speed is high, the driver under tension may firmly grab the steering wheel 7, and hence his hands may slightly tremble in operating the grip 9, so that a noise is liable to affect the command value of the turning angle. However, the first correction coefficient K1 becomes small in a high-speed traveling to decrease the command value of the turning angle, thereby suppressing fluctuation of the turning angle due to the influence of the noise. On the other hand, when the vehicle speed is low, the driver is not likely to firmly grab the steering wheel 7, and it is unlikely that noise will be generated to affect the command value of the turning angle which is outputted by the operation of the grip 9. In the low vehicle speed range, the first correction coefficient K1 becomes large, thereby controlling the turning angle which sufficiently reflects an intention of the driver operating the grip 9.

Further, the second correction coefficient K2 increases a relative amount to change the turning angle corresponding to an increase of steering angle. Specifically, during traveling with a small steering angle where the driver has no intention to turn the vehicle, the second correction coefficient K2 decreases, thereby suppressing an undesirable change of attitude of the vehicle due to erroneous operation of the grip 9; and during traveling with a large steering angle where the driver has an intention to quickly turn the vehicle, the second correction coefficient K2 increases, thereby alleviating the operational burden on the driver operating the steering wheel 7.

Furthermore, the third correction coefficient K3 decreases a relative amount to change the turning angle corresponding to an increase of lateral acceleration. Specifically, when a sudden lateral acceleration is generated, the third correction coefficient K3 decreases, thereby suppressing an undesirable change of attitude of the vehicle due to erroneous operation of the grip 9; and when a sufficient lateral acceleration cannot be generated based only on the operation of the steering wheel 7, the third correction coefficient K3 is at a high level to assure that a high lateral acceleration can be generated corresponding to the driver's intention.

Figure 10A:
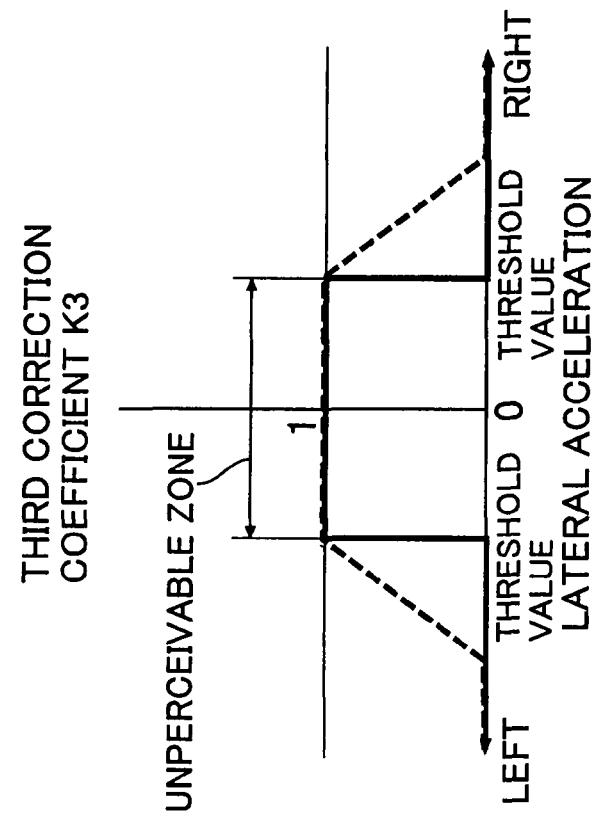
FIGS. 10A and 10B are diagrams showing maps for searching second and third correction coefficients in accordance with a third embodiment of the present invention.

FIG. 10A shows the second correction coefficient K2 according to a third embodiment. In the third embodiment, the second correction coefficient K2 is constantly 0 in a range in which the absolute value of the steering angle is smaller than a threshold value, and a turning angle is not generated by a command through the grip 9. In a range in which the absolute value of the steering angle is equal to or larger than the threshold value, the second correction coefficient K2 is instantaneously or gradually increased from 0 to 1, and eventually the full value of the turning angle commanded by the grip 9 is generated.

Figure 10B:
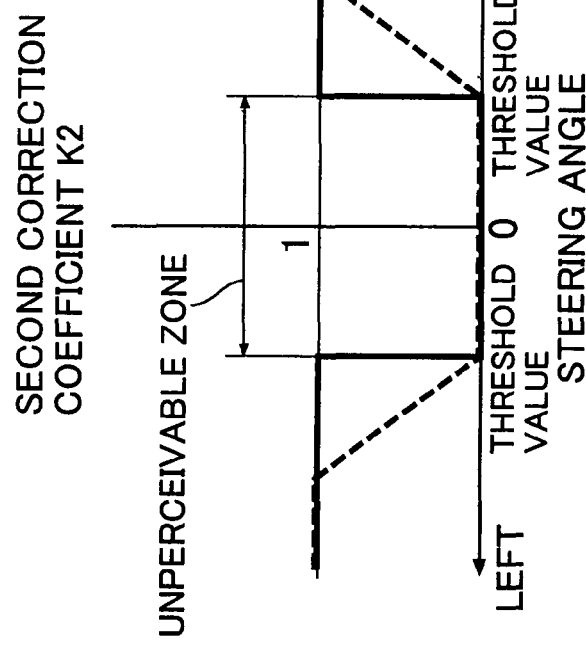

FIG. 10B shows the third correction coefficient K3 according to the third embodiment. In the third embodiment, the third correction coefficient K3 is constantly 1 in a range in which the absolute value of the lateral acceleration is smaller than a threshold value, in which the full value of turning angle commanded by the grip 9 is generated. In a range in which the absolute value of the lateral acceleration is equal to or larger than the threshold value, the third correction coefficient K3 is instantaneously or gradually decreased from 1 to 0, and accordingly the turning angle commanded by the grip 9 is not generated eventually.

Figure 11:
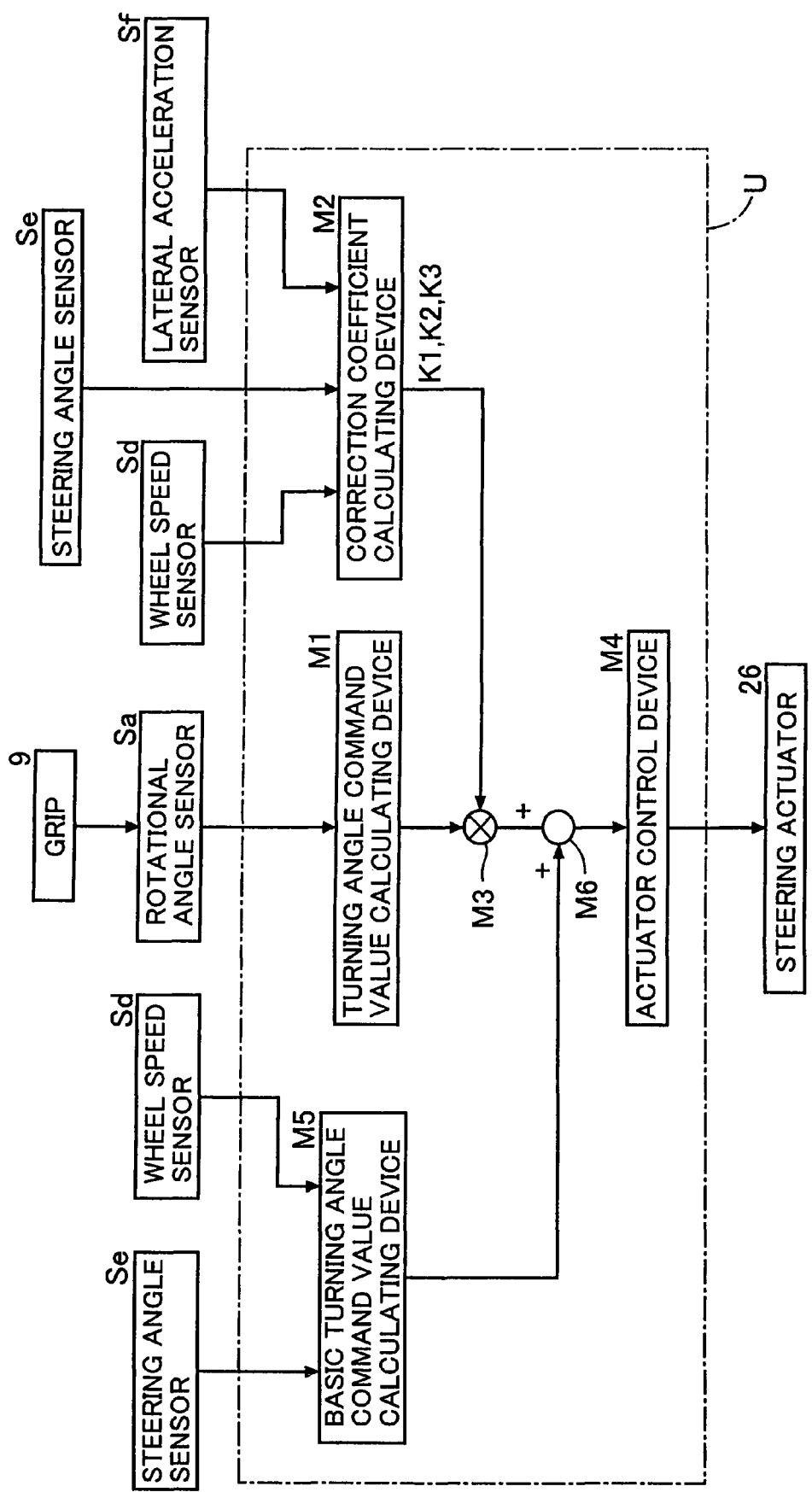
FIG. 11 is a block diagram showing the arrangement of a yaw moment control system according to a fourth embodiment of the present invention.

A fourth embodiment of the present invention will now be described with reference to FIG. 11.

In the above-described second embodiment, the rear wheels WRL and WRR are turned based on the operation of the grip 9 by the driver. However, in the fourth embodiment in which the rear wheels WRL and WRR are automatically turned corresponding to the state of the vehicle, the turning amount is regulated based on the operation of the grip 9 by the driver.

More specifically, the electronic control unit U includes a basic turning angle command value calculating device M5 and an adding device M6, in addition to the turning angle command value calculating device M1, the correction coefficient calculating device M2, the multiplying device M3 and the actuator control device M4 of the second embodiment. The wheel speed sensors Sd and the steering angle sensor Se are connected to the basic turning angle command value calculating device M5. The adding device M6 is disposed between the multiplying device M3 and the actuator control device M4.

A vehicle speed detected by the wheel speed sensors Sd and a steering angle detected by the steering angle sensor Se are inputted to the basic transferred turning angle command value calculating device M5, which calculates a command value of a basic turning angle corresponding to the vehicle speed and the steering angle. When the driver does not operate the grip 9, the actuator control device M4 drives the steering actuator 26 while setting the command value of the basic turning angle as a target value, thereby performing an automatic steering control in order to cause the turning angle of the rear wheels WRL and WRR to coincide with the basic turning angle.

When the driver operates the grip 9 during such an automatic steering of the rear wheels WRL and WRR, the command value of the corrected turning angle outputted by the multiplying device M3 is added, in the adding device M6, to the command value of the basic turning angle outputted by the basic turning angle command value calculating device M5. Based on the final turning angle after the addition, the actuator control device M4 drives the steering actuator 26. As a result, the turning angle can be increased or decreased as desired by operating the grip 9 during the automatic steering of the rear wheels WRL and WRR.

A fifth embodiment of the present invention will now be described with reference to FIG. 12.

The fifth embodiment is a modification of the second embodiment shown in FIG. 8. In place of the four-wheel steering device in the second embodiment, the fifth embodiment comprises a driving-force lateral distribution device, as a yaw moment control system, capable of distributing a driving force generated by the engine E to the left and right wheels at any ratio. Therefore, the fifth embodiment includes a driving-force distribution command value calculating device M1' and a driving-force distribution actuator 27, in place of the turning angle command value calculating device M1 and the steering actuator 26 in the second embodiment.

Thus, according to the fifth embodiment, in place of the turning of the rear wheels WRL and WRR by the steering actuator 26, a yaw moment can be generated by the driving-force lateral distribution device actuated by the driving-force distribution actuator 27.

A sixth embodiment of the present invention will now be described with reference to FIG. 13.

The sixth embodiment is a modification of the fifth embodiment shown in FIG. 12. The electronic control unit U comprises a basic driving-force distribution command value calculating device M5' and an adding device M6, in addition to the driving-force distribution command value calculating device M1', the correction coefficient calculating device M2, the multiplying device M3 and the actuator control device M4 in the fifth embodiment. The wheel speed sensors Sd and the steering angle sensor Se are connected to the basic driving-force distribution command value calculating device M5'. The adding device M6 is disposed between the multiplying device M3 and the actuator control device M4.

Thus, according to the sixth embodiment, when the driver operates the grip 9 during the distribution of the driving force to the left and right wheels, a corrected driving-force distribution command value outputted by the multiplying device M3 is added, in the adding device M6, to a basic driving-force distribution command value outputted by the basic driving-force distribution command value calculating device M5'. Based on the final driving-force distribution command value after the addition, the actuator control device M4 drives the driving-force distribution actuator 27. As a result, the amount of driving force distributed to the left and right wheels can be arbitrarily increased or decrease as desired by operating the grip 9 during the distribution of the driving force to the left and right wheels.

The embodiments of the present invention have been described above, but various changes in design may be made without departing from the subject matter of the present invention.

For example, in the embodiments, the hydraulic pressure control device 4 (the brake-force lateral distribution device) capable of arbitrarily distributing the braking force to the left and right wheels, the four-wheel steering device, and the driving-force lateral distribution device have been described as the yaw moment generating device of the present invention, but it is also possible to use, as a yaw moment generating device, a usual steering device for steering only front wheels and a damping-force changing device capable of individually controlling the rigidity of dampers of left and right suspensions.

In the case where the usual steering device is employed as a yaw moment generating device, the operation of the grip 9 for steering the front wheels can be easily effected in conjunction with the operation of the steering wheel 7 for steering the front wheels, so that the yaw moment can be increased or decreased in an amount corresponding to the amount provided by the operation of the grip 9. Further, if the engagement portion 15 of the brake pedal 1 or the engagement portion 23 of the accelerator pedal 18 is operated, an amount of steering of the front wheels can be increased or decreased corresponding to an amount of such operation of the engagement portion, thereby generating any yaw moment as desired.

In the case where the damping-force changing device capable of individually controlling the rigidity of the dampers of the left and right suspensions is employed as a yaw moment generating device, if the rigidity of the damper on the wheel on the outer side in the turning direction is increased and the rigidity of the damper on the wheel on the inner side in the turning direction is decreased, the outward falling of the vehicle body in the turning direction due to a centrifugal force is suppressed, thereby generating a yaw moment for assisting the turning of the vehicle.

As another example, the grip 9 of the steering wheel 7, the engagement portion 15 of the brake pedal 1, or the engagement portion 23 of the accelerator pedal 18 may be rotatable or swingable in a non-stepwise manner (continuously) or in a stepwise manner.

As a third example, the above embodiments comprises all the grip 9 of the steering wheel 7, the engagement portion 15 of the brake pedal 1, and the engagement portion 23 of the accelerator pedal 18 as ancillary operation members, but the present invention can be embodied with any one or two of them.

As a final example, left and right grips 9, 9 to be operated respectively by left and right hands may be provided on a steering wheel 7, so that a yaw moment in a leftward turning direction can be generated by the operation of the left grip 9, and a yaw moment in a rightward turning direction can be generated by the operation of the right grip 9.

What is claimed is:

1. A yaw moment control system of a vehicle, comprising:
   a main operation member operated by a driver to control a kinetic state of the vehicle;
   an ancillary operation member provided with the main operation member and operated by the driver;
   a detection member for detecting an amount of operation of the ancillary operation member; and
   a yaw moment generator for generating a yaw moment of the vehicle correspondingly to the amount of operation of the ancillary operation member;
   wherein the main operation member is a steering wheel including an annular steering wheel body and the ancillary operation member is a grip rotatably provided on a portion of the steering wheel body.

2. A yaw moment control system of a vehicle according to claim 1, wherein the yaw moment generator comprises at least one of a braking-force lateral distribution device, a driving-force lateral distribution device, a steering device, a four-wheel steering device and a device for changing a damping force of a suspension damper.

3. A yaw moment control system of a vehicle according to claim 1, wherein the grip is formed of a flexible material such that the steering wheel body maintains its shape when the grip is rotated.

4. A yaw moment control system of a vehicle according to claim 3, wherein the yaw moment generator comprises at least one of a braking-force lateral distribution device, a driving-force lateral distribution device, a steering device, a four-wheel steering device and a device for changing a damping force of a suspension damper.

5. A yaw moment control system for a vehicle according to claim 1, wherein the main operation member may be operated by the driver without operating the ancillary operation member.

6. A yaw moment control system of a vehicle according to claim 1, wherein the grip is selectively rotatable in opposite directions for respectively generating yaw moment of the vehicle in a first direction and a second direction opposite to the first direction.

7. A yaw moment control system of a vehicle according to claim 1, wherein the grip is shaped and disposed for being gripped by a driver of the vehicle during normal steering operations of the vehicle.

8. A yaw moment control system of a vehicle, comprising:
   a steering wheel including an annular steering wheel body operated by a driver to control a kinetic state of the vehicle;
   an ancillary operation member provided on the steering wheel and operated by the driver, and
   a yaw moment generator which generates a yaw moment of the vehicle correspondingly to an amount of operation of the ancillary operation member;
   wherein the ancillary operation member is a grip rotatably provided on a portion of the steering wheel body.

9. A yaw moment control system of a vehicle according to claim 8, wherein the yaw moment generator comprises is at least one of a braking-force lateral distribution device, a driving-force lateral distribution device, a steering device, a four-wheel steering device and a device for changing a damping force of a suspension damper.

10. A yaw moment control system for a vehicle according to claim 8, wherein the main operation member may be operated by the driver without operating the ancillary operation member.

11. A yaw moment control system of a vehicle according to claim 8, wherein the grip is selectively rotatable in opposite directions for respectively generating yaw moment of the vehicle in a first direction and a second direction opposite to the first direction.

12. A yaw moment control system of a vehicle according to claim 8, wherein the grip is shaped and disposed for being gripped by a driver of the vehicle during normal steering operations of the vehicle.

* * * * *